United States Patent
Maher et al.

(10) Patent No.: US 7,104,709 B1
(45) Date of Patent: Sep. 12, 2006

(54) DOCUMENT PRINTING PROCESS

(75) Inventors: James C. Maher, Temple Terrace, FL (US); Richard C. Chatfield, Lutz, FL (US); Daniel Charles, Tampa, FL (US)

(73) Assignee: Rosetta Technologies Corporation, Tampa, FL (US)

( * ) Notice: Subject to any disclaimer, the term of this patent is extended or adjusted under 35 U.S.C. 154(b) by 83 days.

(21) Appl. No.: 10/874,770

(22) Filed: Jun. 23, 2004

Related U.S. Application Data (60) Provisional application No. 60/480,696, filed on Jun. 23, 2003.

(51) Int. Cl.
 B41J 29/38 (2006.01)
 B41M 3/14 (2006.01)

(52) U.S. Cl. ............ 400/76; 400/76; 101/483

(58) Field of Classification Search .......... None
 See application file for complete search history.

(56) References Cited

U.S. PATENT DOCUMENTS

| | | | |
|---|---|---|---|
| 592,533 A | 10/1897 | Rogers et al. | |
| 2,065,605 A | 12/1936 | Moore | |
| 2,804,821 A | 9/1957 | Misuraca | |
| 4,175,774 A | 11/1979 | Tonges et al. | |
| 4,186,943 A | 2/1980 | Lee | |
| 4,510,225 A | 4/1985 | Kuehnle et al. | |
| 4,681,348 A | 7/1987 | Mowry, Jr. | |
| 5,267,753 A | 12/1993 | Chock | |
| 5,271,644 A | 12/1993 | Merry et al. | |
| 5,291,243 A | 3/1994 | Heckman et al. | |
| 5,445,418 A | 8/1995 | Blend | |
| 5,538,290 A | 7/1996 | Diamond | |
| 5,575,508 A | 11/1996 | Diamond | |
| 5,641,183 A | 6/1997 | Diamond | |
| 5,762,378 A | 6/1998 | Phillips | |
| 5,785,353 A | 7/1998 | Diamond | |
| 5,823,576 A | 10/1998 | Lambert | |
| 5,917,996 A | 6/1999 | Thorpe | |
| 5,975,583 A | 11/1999 | Cobben et al. | |
| 5,984,364 A | 11/1999 | Diamond | |
| 6,089,610 A | 7/2000 | Greene | |

(Continued)

FOREIGN PATENT DOCUMENTS

JP 2000033765 A * 2/2000

(Continued)

OTHER PUBLICATIONS

Brain, Marshall; "How Counterfeiting Works;" http://money.howstuffworks.com/counterfeit1.htm, pp. 1-7.*

Primary Examiner—Daniel J. Colilla
(74) Attorney, Agent, or Firm—Frijouf, Rust & Pyle, P.A.

(57) ABSTRACT

A process is disclosed for printing a document such as a negotiable instrument in a first and a second color for increasing the security of the document. A major portion of the document is printed with a first information in a first color from a first printer. A second information is created from at least a portion of the first information for proving a security pattern. The security pattern is printed over a minor portion of the document in the second color from a second printer to increase the security of the document. The process may be used for printing a check in a magnetically readable first color and a non-magnetically readable second color including colors having a color spectrum located outside of the color spectrum range of a conventional color photocopier.

22 Claims, 5 Drawing Sheets

U.S. PATENT DOCUMENTS

| | | |
|---|---|---|
| 6,233,340 B1 | 5/2001 | Sandru |
| 6,530,601 B1 | 3/2003 | Greene |
| 6,549,624 B1 | 4/2003 | Sandru |
| 6,603,568 B1 * | 8/2003 | Sansone .................... 358/1.14 |
| 2003/0056104 A1 * | 3/2003 | Carr et al. .................. 713/176 |

FOREIGN PATENT DOCUMENTS

JP    2002067548 A  *  3/2002

* cited by examiner

DOCUMENT PRINTING PROCESS

CROSS-REFERENCE TO RELATED APPLICATIONS

This application claims benefit of U.S. Patent Provisional application Ser. No. 60/480,696 filed Jun. 23, 2003. All subject matter set forth in provisional application Ser. No. 60/480,696 is hereby incorporated by reference into the present application as if fully set forth herein.

BACKGROUND OF THE INVENTION

1. Field of the Invention

This invention relates to the process of printing and more particularly to an improved process for printing a document such as a negotiable instrument in a first color and a second color for enhancing the security of the document.

2. Background of the Invention

The fraudulent use of monetary instruments such as checks, drafts, bonds and the like has presented a significant problem to both the financial community and the general population. Currently, the annual estimated cost of check fraud is between $10 and $20 billion dollars. There are two primary forms of check fraud. The first is counterfeiting, which is the unauthorized photocopying or other reproduction of an otherwise valid check. The second is alteration, which is the reliance on an otherwise valid check and the attempts either through chemical or mechanical means to alter an item on the otherwise valid check. The difference between these two forms of check fraud are important, since the identification and preventive measures utilized to combat one form of fraud may not effectively address the other form.

Through the years, many devices have been developed to prevent check fraud. However, as technology has progressed, so has the sophistication of the perpetrators of check frauds, thereby requiring more sophisticated prevention methods. The advent of powerful personal computers, copy machines, color copiers, scanners and printers has enabled the production of high quality counterfeit monetary instruments. Some attempts to deter the proliferation of fraudulent checks are addressed by the following inventions.

U.S. Pat. No. 592,533 to Rogers et al. discloses an invention comprising a check marking device. The object of the device is to provide a new and simple means for impressing upon the paper of checks, drafts, or similar documents in non-erasable characters the values of the documents. The present invention raises and breaks the fiber of the paper similarly to that of high embossing, while not necessarily puncturing or perforating the paper.

U.S. Pat. No. 2,065,605 to Moore discloses an invention relating to negotiable instrument safety paper. The primary object of the invention resides in the provision of a safety paper for checks, promissory notes, drafts, bonds and the like upon which is provided a novel arrangement of ink-bearing surfaces which make alterations or changes in such instruments, after they have been finally drafted, difficult if not impossible to perform without showing that the paper has been tampered with or altered in some manner from its original form.

U.S. Pat. No. 2,804,821 to Misuraca teaches an invention relating to check protecting means and more particularly to an inexpensive and reliable form thereof. An object of the present invention is to provide a check protecting stamp which will impose a design over the space on a check containing the name of the payee and the amount so that any attempt to change either the name or the amount will so deface the check as to make it impossible to avoid evidence of such tampering.

U.S. Pat. No. 4,175,774 to Tonges et al. teaches a document with a background printed thereon which includes a first portion formed of small dots and a second portion formed of larger dots. The larger dots are of a size that is reproduced by a copying machine. The small dots are of a size that is not reproduced by the copying machine. When a copy is made, only the larger dots reproduce so that the copy is readily distinguishable from the original.

U.S. Pat. No. 4,186,943 to Lee discloses a sheet element, such as a banknote or other document of intrinsic value, incorporating an optical authenticating device comprising a thin film element in the form of a strip, or thread disposed within the thickness of the sheet element and having known characteristics of spectral reflectance and transmittance. A region of a least part of the thin film element the sheet element is formed with a pair of superposed windows between which the thin film element extends so as to be visible through each window.

U.S. Pat. No. 4,510,225 to Kuehnle et al. teaches an opaque reflective print copy produced by transferring via heat and pressure, an electrophotographically formed toner image to a presoftened transparent thermoplastic thin layer carried bonded to an opaque substrate. The print is formed of at least one generally planar toner image layer embedded in the plastic layer near the outer surface thereof. The light illuminating the print enters the thin layer and is reflected from the interface between the layer and the substrate, passing through the toner particles as well as being reflected from the toner particles themselves, whereby to provide an image having greater depth intensity and contrast than can be obtained using silver halide photographic film, all without distortion of the image, loss in density or loss in resolution. The substrate may have smooth or roughened surface, and may be selected from plain or coated paper, metal, stone, stretchable and/or inflatable media as well as irregularly shaped objects. Successive toner images may be applied superimposed one on the other in layers and in registry by softening the thermoplastic layer after transfer thereto of one toner image and applying the next toner image thereto. The intermediate heating embeds the toner image and readies the receptor to receive the next toner image.

U.S. Pat. No. 4,681,348 to Mowry, Jr. discloses a document protected against alteration comprising a sheet of paper having, on its face, an area in which numerals representing a sum of money to be paid on the document are printed. The area has a left end and a right end, and the entire length of the area, from the left end to the right end, is filled with printing so that unauthorized insertions cannot be made in the area.

U.S. Pat. No. 5,267,753 to Chock teaches a bank draft form incorporating a hologram as an anti-counterfeit measure. The hologram may extend over a substantial portion of the bank draft form, including the signature entry area and other data entry areas of the form, e.g. the date, payee, and amount areas. The hologram includes an outer layer of a transparent layer of ink compatible material over such areas. The transparent layer of ink compatible material allows the drawer to affix his or her signature within the signature entry area and to enter the various terms of the draft, e.g. the date, amount, payee etc. Writing upon the ink compatible surface of the hologram partially occults the hologram underneath such writing and may cause the embossed surface of the hologram to become etched. The partial effacing of the hologram increases the difficulty of its duplication by a counterfeiter. If the hologram extends over portions of the bank draft form other than the signature entry area and the data entry areas, selected portions of the hologram outside such areas may have a transparent layer of ink incompatible material. A transparent layer of ink incompatible material may serve to protect such areas of the hologram from fingerprints, accidental marking, etching, and the like. Optionally, after the holographic bank draft form is completed and executed, the holographic portion may then be covered with a protective laminate so as to prevent its alteration.

U.S. Pat. No. 5,271,644 to Merry et al. discloses a security-printing device comprising a substrate; a toner image adhered to the substrate; and a layer of an optically variable material adhered solely to the toner image. The optically variable material is selected to provide a distinct visual appearance and is not readily reproducible or readily available in the general market-place.

U.S. Pat. No. 5,291,243 to Heckman et al. teaches a system for printing security documents which have copy detection or tamper resistance in plural colors with a single pass electronic printer printing an integrated image controlled by an image generation system which electronically generates a safety background image pattern with first and second interposed color patterns which are electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which becomes visible when copied, and/or are machine readable even in copies.

U.S. Pat. No. 5,445,418 to Blend teaches a security paper having a number of parallel lines having a substantially uniform first spacing, irregularly interrupted by a plurality of stripes having a second spacing greater than the first spacing, flexographically printed on at least one face of a web which becomes, after further processing, a security document such as a bank check. The parallel lines typically are substantially straight and of substantially uniform thickness and formed of flexo ink, such as the type which becomes invisible when bleached. Alphanumeric indicia are preferably provided within the stripes either oriented parallel to the parallel lines (and alternately extending from top to bottom, and bottom to top), or perpendicular to the parallel lines. A pattern is provided that repeats at an interval significantly greater than the length of the security document formed from the security paper. At least one of the faces of the security document, typically the face opposite that having the parallel lines, has readable alphanumeric indicia appropriate for a security document imaged on it. The web on which the flexographic printing and imaging takes place is ultimately cut into individual security documents or sets of security documents, with the interval of a security pattern about 15–17 inches, and the length of the security document about 5.5–12 inches. The web may be taken up and shipped to another location after flexographic printing and tensioning to stretch the pattern, prior to imaging of the security document indicia.

U.S. Pat. No. 5,538,290 to Diamond teaches a method and apparatus for enhancing the security of a check or negotiable document and deterring the generation of copies of the check or negotiable document. The signature area of a document is imprinted with a pantographic background design different from a pantographic background design covering the remainder of the face of a check. A warning clause describes the color and/or background of the signature area. The endorsement area of a document is also imprinted with a pantographic background design. A warning clause describes the color and/or background of the endorsement area. The endorsement area background may further include a representation of the watermark certification seal to aid an individual in more quickly determining whether the proper watermark seal exist on the check or negotiable document.

U.S. Pat. No. 5,575,508 Diamond discloses to a method and apparatus for enhancing the security of a check or negotiable document and deterring the generation of copies of the check or negotiable document. The signature area of a document is imprinted with a pantographic background design different from a pantographic background design covering the remainder of the face of a check. A warning clause describes the color and/or background of the signature area. The endorsement area of a document is also imprinted with a pantographic background design. A warning clause describes the color and/or background of the endorsement area. The endorsement area background may further include a representation of the watermark certification seal to aid an individual in more quickly determining whether the proper watermark seal exist on the check or negotiable document.

U.S. Pat. No. 5,641,183 to Diamond discloses a method and apparatus for enhancing the security of a check or negotiable document and deterring the generation of copies of the check or negotiable document. The signature area of a document is imprinted with a pantograph background design different from a pantograph background design covering the remainder of the face of a check. A warning clause describes the color and/or background of the signature area. The endorsement area of a document is also imprinted with a pantograph background design. A warning clause describes the color and/or background of the endorsement area.

U.S. Pat. No. 5,762,378 to Phillips teaches a pattern of fine slits formed in the material of document where sensitive information is intended to be printed or imprinted wherein the slit pattern modifies the tensile strength of the substrate. In addition, the slit pattern modifies the toner or ink permeability of a substrate to facilitate the penetration of the toner or ink printed or imprinted on the surface of document into the substrate. Further, the design of the slit pattern can be coordinated with a latent image pattern to comprise optical properties such that the physical response of a typical duplicating or photocopy device to the validation mark will allow a copy to be easily discerned from an original.

U.S. Pat. No. 5,785,353 to Diamond discloses a negotiable document includes enhanced security for deterring the fraudulent photocopying of the subject negotiable document. A first pantographic design is imprinted as the general background of the front face of a check and a second pantographic background design is imprinted in the amount line and in the signature line. The enhanced security document of the present invention further includes a muted warning phrase of a first dot size incorporated in the first pantographic design and a muted warning phrase of a second dot size incorporated in the second pantographic background design. Alternatively, it will be understood that a similar warning phrase may be generated with a different first and second size dot density or line density instead of a first dot size and a second dot size. By using a plurality of line densities, or dot densities, or dot sizes for the warning phrases, an unauthorized individual will be unable to adjust a photocopier to mask a single warning phrase.

U.S. Pat. No. 5,823,576 to Lambert teaches a document that resists copying by ordinary color copiers and color scanners. An area that is printed with color dots using a gradient print screen that exceeds resolutions available on commonly available color copiers and color scanners. The area may therefore comprise lighter regions (having fewer screen lines per inch) and darker regions (having more screen lines per inch). Multiple colors may be printed with different gradient print screens, and regions which are darker or lighter for a first color may or may not be darker or lighter for a second color. The document may also comprise a second area that is printed with a moire pattern. The moire pattern may be generated by adjusting an angle between a pair of print screens, such as a pair of gradient print screens. A set of colors for printing may avoid common printing ink colors, may prefer yellow, light green, or light blue, and may avoid red, purple, or violet, to raise the difficulty in copying by color copiers or color scanners. A top layer of the area may be covered with a layer of matte varnish or transparent white ink.

U.S. Pat. No. 5,917,996 to Thorpe discloses a system for single-pass printing of a tamper-resistant, electronic form character on a print media sheet. The system includes a printing subsystem and a character generation subsystem communicating with the printing subsystem. The character generation subsystem includes (1) a database for storing a plurality of tamper-resistant, composite electronic form characters, each of the plurality of tamper-resistant, composite electronic form characters including an electronic form character overlaying a security background, and (2) a character manager for retrieving a selected one of the plurality of tamper-resistant, composite electronic form characters from the database in response to an instruction provided by the printing subsystem to the character manager, the selected one of the plurality of tamper-resistant, composite electronic form characters being transmitted to the printing subsystem for single-pass printing thereof on the print media sheet.

U.S. Pat. No. 5,975,583 to Cobben et al. discloses a carrier representing value provided with recognizable pattern, for instance in the form of giro checks, bankchecks, banknotes, shares, bonds and other documents representing a value, wherein the patterns are formed by parts treated by means of a laser beam. This object is reached in that the patterns have been provided by means of a laser light beam. The use of a laser beam makes it possible to apply particularly fine structures which either cannot be applied with other treating methods, or only with the greatest financial effort. The use of laser beams enables variation of the width or depth of the channels or perforations which is almost impossible with other treating methods.

U.S. Pat. No. 5,984,364 to Diamond teaches a negotiable document including enhanced security for deterring the fraudulent photocopying of the subject negotiable document. The present invention includes at least one true fourdrinier watermark and/or at least one artificial watermark comprising a fingerprint and a visually perceptible watermark representation for comparison with the watermark to determine the validity of the negotiable document. The visually perceptible representation is printed with thermochromatic ink. When the visually perceptible representation is rubbed with a live human hand, heat is transferred to the thermochromatic ink. The visually perceptible representation will fade and disappear as the ink is heated by the rubbing action and heat of the hand. The negotiable document further includes a warning clause notifying the user of the disappearing properties of the visually perceptible representation.

U.S. Pat. No. 6,089,610 to Greene discloses a security system for a document utilizing a plurality of fluorescent snippets on the document with other encryption data printed thereon with visible and invisible ink that becomes bright when subjected to certain light. The system combines visible and invisible data that is encrypted, totaled and when subjected to a algorithm will match a selected component of the data.

U.S. Pat. No. 6,233,340 to Sandru teaches an apparatus and method for enhancing the security of selected information associated with a negotiable document, such as the monetary value of a check. In the invention, one or more security features are printed or applied onto the check. One such security feature is an encrypted control code. The preferred embodiment employs a secret key cryptographic scheme to encrypt the monetary value and thereby generate a first control code which is printed on tile check. When the check is presented for payment, a validator, such as bank or check clearing house, employs a verification system having a copy of the encryption key to read the monetary value from the check and re-encrypt it according to the scheme to generate a second control code. The check is not honoured if the first and second control codes are not identical. Another security feature is a security image, composed, for instance, from a foreground image of the monetary value superimposed over a background motif image. The security image has a number of hidden attributes, such as the relative aspect ratios, absolute and relative dimensions of the underlying foreground and background images, that are preselected and used when printing the security image. When the check is presented for payment a teller can visually inspect the security image for compliance with certain of the preselected attributes. The preferred validation system can also electronically scan the security image for the hidden attributes. This comparison makes it difficult for a forger to copy, for instance, the monetary value of the check and add a significant digit to it because some of the foregoing preselected image attributes are liable to change and be detected. The composite image serves as a back-up security when verification of the encrypted control code is not possible.

U.S. Pat. No. 6,530,601 to Greene teaches a security system for a document utilizing a plurality of fluorescent snippets on the document with other encryption data printed thereon with visible and invisible inks that becomes bright when subjected to certain light. The system combines visible and invisible data that is encrypted, totaled and when subjected to an algorithm will match a selected component of the data.

U.S. Pat. No. 6,549,624 to Sandru teaches an apparatus and method for enhancing the security of selected information associated with a negotiable document, such as the monetary value of a check. In the invention, one or more security features are printed or applied onto the check. One such security feature is an encrypted control code. The preferred embodiment employs a secret key cryptographic scheme to encrypt the monetary value and thereby generate a first control code which is printed on the check. When the check is presented for payment, a validator, such as bank or check clearing house, employs a verification system having a copy of the encryption key to read the monetary value from the check and re-encrypt it according to the scheme to generate a second control code. The check is not honored if the first and second control codes are not identical. Another security feature is a security image, composed, for instance, from a foreground image of the monetary value superimposed over a background motif image. The security image has a number of hidden attributes, such as the relative aspect ratios, absolute and relative dimensions of the underlying foreground and background images, that are preselected and used when printing the security image. When the check is presented for payment a teller can visually inspect the security image for compliance with certain of the preselected attributes. The preferred validation system can also electronically scan the security image for the hidden attributes.

Therefore, it is an object of this invention to provide a process of printing a document in a first color and a second color that provides a significant advancement in the document security art.

Another object of the present invention is to provide a process of printing a document in a first color and a second color that for increasing the security of the document by making the document more tamper evident.

Another object of the present invention is to provide a process of printing a document in a first color and a second color that is useful for increasing the security of negotiable instruments such as checks.

Another object of the present invention is to provide a process of printing a document in a first color and a second color that provides highly secure documents with the use of existing printing devices for with little or no modification.

Another object of the present invention is to provide a process of printing a document in a first color and a second color that provides highly secure documents with the use of conventional paper.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved process for printing a document in a first and a second color for increasing the security of the document. A major portion of the document is printed with a first information in a first color from a first printer. A second information is created from at least a portion of the first information for proving a security pattern. The security pattern is printed over a minor portion of the document in the second color from a second printer to increase the security of the document.

In one example, the document is a negotiable instrument such as a check, a bond, a stock certificate or the like. Preferably, the security pattern is printed in a repeated pattern about minor portions of the document for increasing the security of the document. The security pattern may be printed to overlay at least a portion of the first color.

In a more specific embodiment of the invention, the first information includes fixed information and variable information. The fixed information defines the document format whereas the variable information may include a payee of the document, a monetary value of the document and a check routing code of a check.

In another specific embodiment of the invention, the second information is created by extracting variable information from the first information for printing a plurality of the security patterns containing variable information over minor portions of the document in the second color from the second printer for increasing the security of the document.

In a more specific embodiment of the invention, the first color is a black magnetically readable ink. The second color is non-magnetically readable and has a color spectrum that includes colors located outside of the color spectrum range of a conventional color photocopier. The second color may have a color spectrum incompatible with the color spectrum range of a conventional color photocopier.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
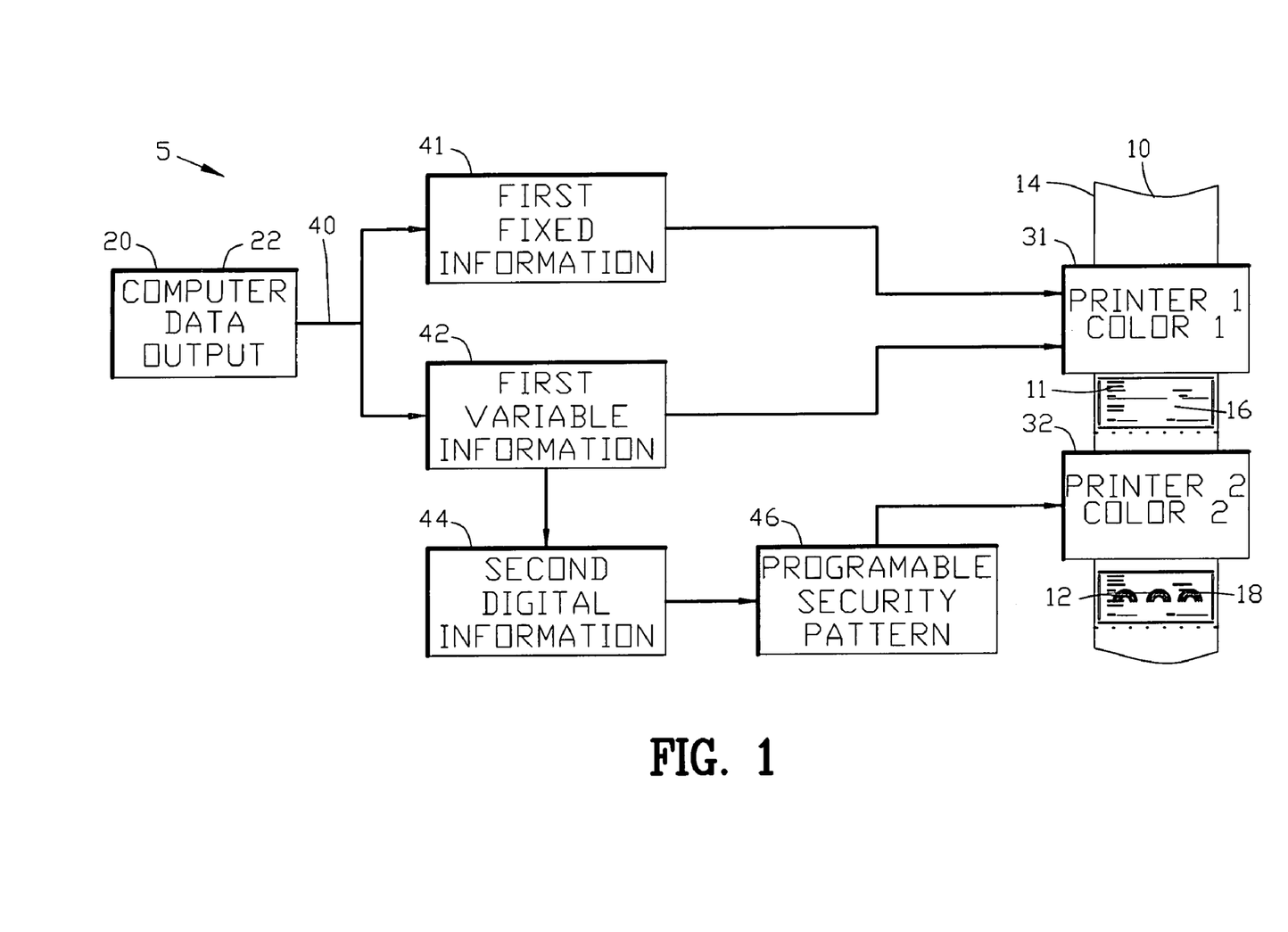
FIG. 1 is a block diagram illustrating a process for printing a document in a first color and a second color for enhancing the security of the document.

FIG. 1 is a block diagram illustrating a process 5 for printing a document 10 to enhance the security of the document 10. The document 10 may be any type of document 10 such as a negotiable instrument, a check, a note, a bond, a stock certificate or any other type of document 10 requiring an enhanced security or a tamper evident feature. The process 5 enables the document 10 to be printed in a first ink type 11 and a second ink type 12 by a computer 20 through a first and a second printer 31 and 32.

In this example of the invention, the document 10 is a negotiable instrument shown as a series of checks 10. The first and second printers 31 and 32 print each check 10 in a first color 11 and a second color 12. Preferably, the first and second printers 31 and 32 are high-speed printers such as laser printers or any suitable printer. As will be described in greater detail hereinafter, the printing of the checks 10 in the first and second colors 11 and 12 enhances the security of the document 10. The enhanced security of the document 10 may be achieved on conventional printer paper.

The computer 20 may be any suitable size or type including a mainframe computer, a mini-computer or a microcomputer or may be a series of computers operating in a network configuration.

The computer 20 includes a computer software program 22 for generating a conventional data stream of information 40 for printing a conventional check in a single ink type.

The conventional data stream of first information 40 includes first fixed information 41 and first variable information 42. The first fixed information 41 typically includes the layout or the format of the check including the name and address of the checking account holder, the name of the bank, the check routing number as well as any decorative aspects of check. Although first fixed information 41 may be customized in accordance with the personal desires of the account holder, once these modifications are completed, the modification remain fixed during the printing of a series of checks.

The first variable information 42 of the conventional data stream of information 40 varies for each of the series of checks 10. The first variable information 42 typically includes the name of the payee of the check 10 as well as the monetary value of the check 10. The first variable information 42 is different for each of the series of printed checks 10.

In the prior art, the software program 22 generated the first fixed information 41 and the first variable information 42 for printing a series of checks. The series of checks were printed in a single ink type and/or a single color. The first fixed information 41 and the first variable information 42 were printed on the series of checks in a single pass in a single printer.

The process 5 of the present invention includes creating second information 44 from at least a portion of the first information 40. In one example, the second information 44 is extracted from the first variable information 42 of the first information 40. Preferably, the second information 44 includes the payee of the check 10 and/or the monetary value of the check 10.

The second information 44 is used to create a security pattern 46 for the check 10. Preferably the security pattern 46 includes the payee of the check 10 and/or the monetary value of the check 10. The security pattern 46 may contain a statement regarding the ink type, color and/or the resolution of the security pattern 46. The security pattern 46 may be a decorative security pattern 46.

The first fixed information 41 containing the format for the check 10 and the first variable information 42 containing the payee and/or the monetary value of the check 10 is directed to the first printer 31. The first fixed information 41 and the first variable information 42 is printed over a major portion 16 of the check 10. The first fixed information 41 and the first variable information 42 is printed in the first type of ink 11. Preferably, the first type of ink is a magnetically readable first color toner for the first laser printer 31. In one example, the first color toner is a black toner.

The security pattern 46 containing the payee and/or the monetary value of the check 10 is directed to the second printer 32. The security pattern 46 is printed over a minor portion 18 of the check 10. The security pattern 46 is printed in the second type of ink 12. Preferably, the second type of ink is a non-magnetically readable second color toner for the second laser printer 32. The second color toner is a different color than the first color toner.

The first and second printers 31 and 32 independently and serially print the series of checks 10. Preferably, the first printer 31 prints the first fixed information 41 and the first variable information 42 in the first type of ink 11. Thereafter, the second printer 32 prints the security pattern 46 in the second type of ink 12.

Figure 2:
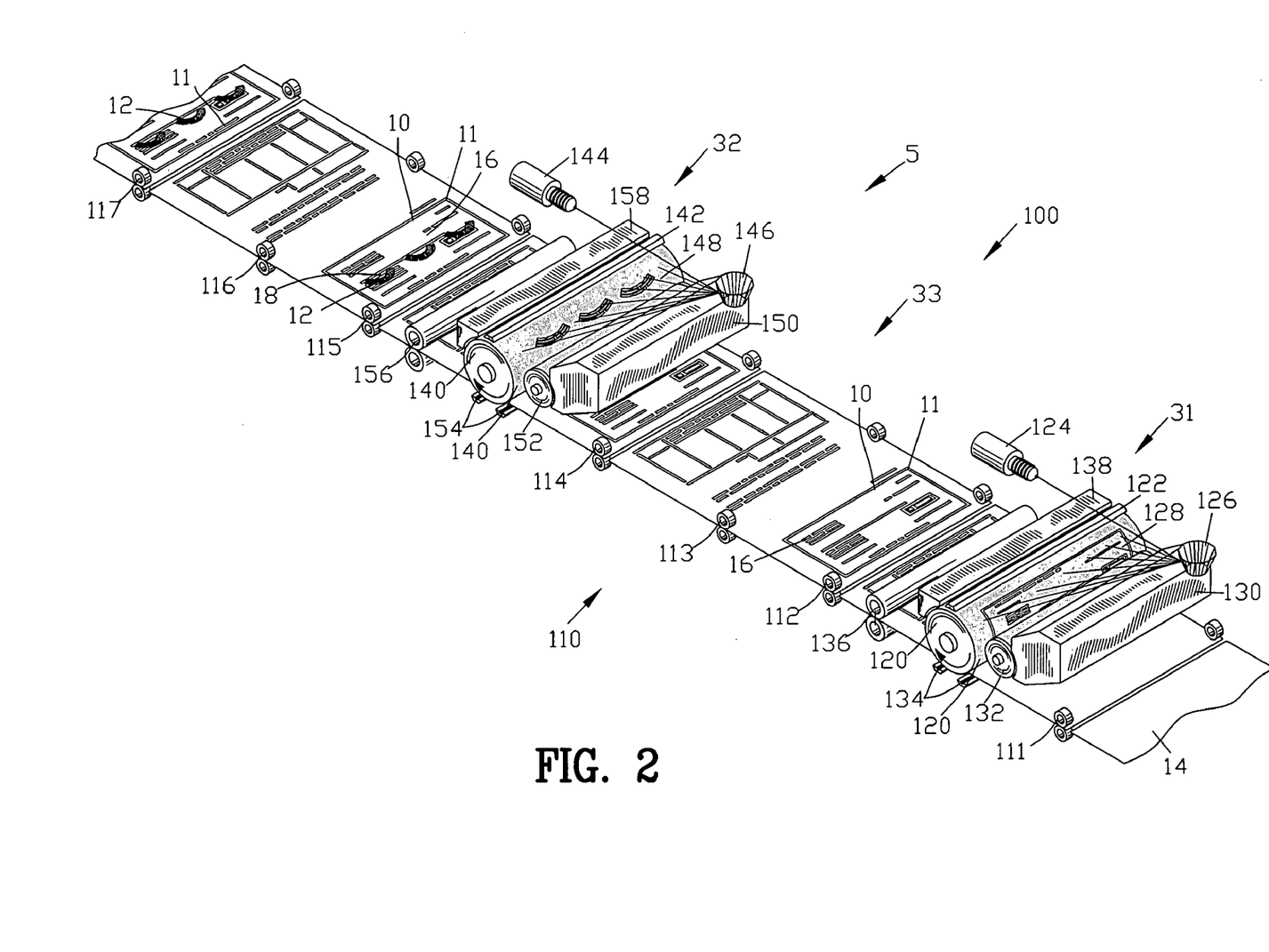
FIG. 2 is an isometric view of an apparatus for printing a document in according with the process of FIG. 1.

FIG. 2 is an isometric view of an apparatus 100 for printing the document 10 in accordance with the process 5 of the present invention of FIG. 1. The apparatus 100 comprises the first printer 31 and the second printer 32 disposed in an adjacent relationship for serially printing the document 10. Preferably, a space 33 is disposed between the first printer 31 and the second printer 32. The purpose of the space 33 between the first and second printers 31 and 32 will be described in greater detail hereinafter.

A plurality of rollers 110 move the paper 14 through the first printer 31, the space 33 between the first and second printers 31 and 32 and through the second printer 32. The plurality of rollers 110 comprises rollers 111–117.

The first printer 31 is shown as a first laser printer 31 capable of being modified to use a first type of ink 11 common referred to as a first toner 11. Although the first printer 31 is shown as a first laser printer 31 it should be understood that other types of printers may be use with the process 5 of the present invention.

The second printer 32 is shown as a second laser printer 32 capable of being modified to use a second type of ink 12 common referred to as a second toner 12. Although the second printer 32 is shown as a second laser printer 32 it should be understood that other types of printers may be use with the process 5 of the present invention.

Figure 3:
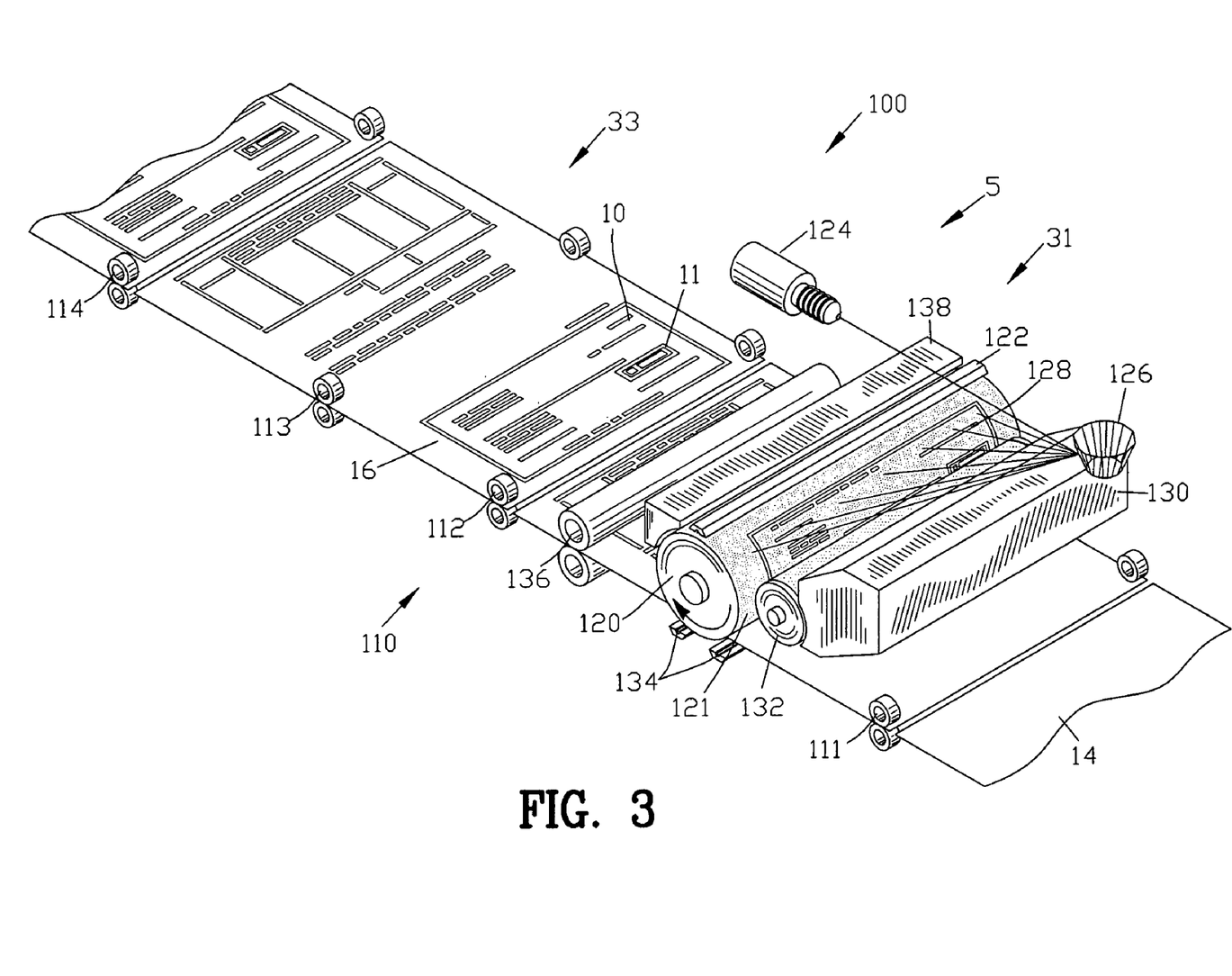
FIG. 3 is an enlarged view of a first stage of the apparatus of FIG. 2.

FIG. 3 is an enlarged view of a first stage of the apparatus 100 of FIG. 2 further illustrating the first laser printer 31. The first laser printer 31 comprises a rotatable drum 120 having a photoconducting surface 121 located on the outer cylindrical surface of the rotatable drum 120. The photoconducting surface 121 of the rotatable drum 120 is charged with a static charge by a charging wire 122. A high voltage is applied to the charging wire 122 to create the static charge on the photoconducting surface 121 of the rotatable drum 120.

A laser 124 is focused by a variable reflective surface 126 to project a laser beam onto the charged photoconducting surface 121 of the rotatable drum 120. The laser 124 and/or the variable reflective surface 126 receive the first fixed information 41 and the first variable information 42 from the computer 20 to project an illuminated image of the document 10 onto the charged photoconducting surface 121 of the rotatable drum 120. The illuminated image of the document 10 projected onto the charged photoconducting surface 121 discharges selective regions of the photoconducting surface 121 to create a charge image of the document 10 on the photoconducting surface 121 of the rotatable drum 120.

The first toner 11 is contained within a toner hopper 130. The first toner 11 is provided with a charge opposite to the charge on the photoconducting surface 121 of the rotatable drum 120. A toner brush 132 applies the first toner 11 to the charge image of the document 10 on the photoconducting surface 121 of the rotatable drum 120. The applied first toner 11 creates a first toner of the document 10 on the photoconducting surface 121 of the rotatable drum 120.

As the rotatable drum 120 rotates, the plurality of rollers 111 and 112 moves the paper 14 in synchronous contact with the photoconducting surface 121 of the rotatable drum 120. The first toner image of the document 10 of the first toner 11 on the photoconducting surface 121 moves into contact with the paper 14. Plural charging wires 134 are disposed under the paper 14 to apply a charge to the paper 14. The charge applied to the paper 14 by the plural charging wires 134 transfers the image of the document 10 of the first toner 11 on the photoconducting surface 121 onto the paper 14.

A heat fuser 136 melts the image of the document 10 of the first toner 11 to the paper 14 to permanently fuse the first toner 11 to the paper 14 to create the document 10. The plurality of rollers 112 and 113 move the document 10 on the paper 14 thorough the space 23 to the second printer 32. The space 33 is provided to enable the paper 14 to cool from the heat of the heat fuser 136 prior to entry into the second printer 32.

A cleaning station 138 removes any remaining charge and/or first toner 11 on the photoconducting surface 121 of the rotatable drum 120. After the removable of the remaining charge and/or first toner 11 on the photoconducting surface 121, the photoconducting surface 121 may be charged by the charging wire 122 to begin a new cycle to print the next document 10.

The first printer 31 prints the document 10 with the first fixed information 41 containing the format for the check 10 and the first variable information 42 containing the payee and/or the monetary value of the check 10. The first fixed information 41 and the first variable information 42 is printed over a major portion 16 of the check 10. The first fixed information 41 and the first variable information 42 is printed in the first toner 11. Preferably, the first toner 11 is a magnetically readable first color toner for the first laser printer 31. In one example, the first color toner is a black toner 11.

Figure 4:
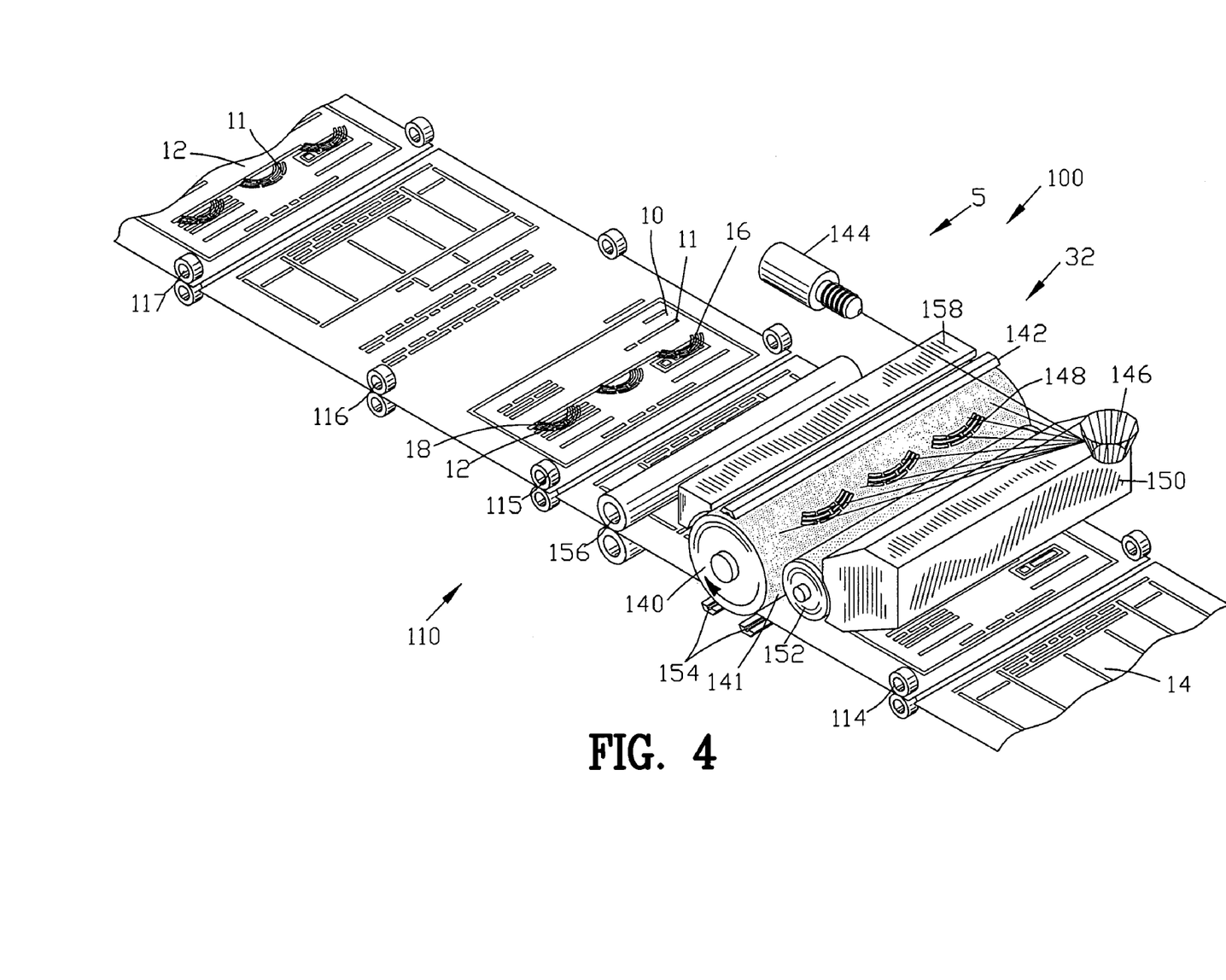
FIG. 4 is an enlarged view of a second stage of the apparatus of FIG. 2.

FIG. 4 is an enlarged view of a second stage of the apparatus 100 of FIG. 2 further illustrating the second laser printer 32. The second laser printer 32 comprises a rotatable drum 140 having a photoconducting surface 141 located on the outer cylindrical surface of the rotatable drum 140. The photoconducting surface 141 of the rotatable drum 140 is charged with a static charge by a charging wire 142 in a manner similar to the first printer 31.

A laser 144 is focused by a variable reflective surface 146 to project a laser beam onto the charged photoconducting surface 141 of the rotatable drum 140. The laser 144 and/or the variable reflective surface 146 receive the second information 44 from the computer 20 to project an illuminated image of the security patterns 46 onto the charged photoconducting surface 141 of the rotatable drum 140. The illuminated image of the security patterns 46 projected onto the charged photoconducting surface 141 discharges selective regions of the photoconducting surface 141 to create a charge image 148 of the security patterns 46 on the photoconducting surface 141 of the rotatable drum 140.

The second toner 12 is contained within a toner hopper 150. The second toner 12 is provided with a charge opposite to the charge on the photoconducting surface 141 of the rotatable drum 140. A toner brush 152 applies the second toner 12 to the charge image 148 of the security patterns 46 on the photoconducting surface 141 of the rotatable drum 140. The applied second toner 12 creates an image of the security patterns 46 with the second toner 12 on the photoconducting surface 141 of the rotatable drum 140.

As the rotatable drum 140 rotates, the plurality of rollers 115 and 116 moves the paper 14 in synchronous contact with the photoconducting surface 141 of the rotatable drum 140. The image of the security patterns 46 with the second toner 12 on the photoconducting surface 141 moves into contact with the paper 14. Plural charging wires 154 are disposed under the paper 14 to apply a charge to the paper 14. The charge applied to the paper 14 by the plural charging wires 154 transfers the image of the security patterns 46 with the second toner 12 on the photoconducting surface 141 onto the paper 14.

A heat fuser 156 melts the image of the security patterns 46 with the second toner 12 to the paper 14 to permanently fuse the second toner 12 to the paper 14 to create the security patterns 46. The plurality of rollers 117 and 118 move the security patterns 46 on the paper 14 to exit the second printer 32.

A cleaning station 158 removes any remaining charge and/or second toner 12 on the photoconducting surface 151 of the rotatable drum 150. After the removable of the remaining charge and/or second toner 12 on the photoconducting surface 141, the photoconducting surface 141 may be charged by the charging wire 152 to begin a new cycle to print the next security patterns 46.

The second printer 32 prints the security patterns 46 with the second information 44 containing the containing the payee and/or the monetary value of the document 10. The security pattern 46 is printed over a minor portion 18 of the check 10 with the second toner 12. The security pattern 46 is printed in the second toner 12. Preferably, the second type of ink is a non-magnetically readable second color toner for the second laser printer 32. The second color toner is a different color than the first color toner.

Preferably, the security pattern 46 is printed in a repeated pattern about minor portions 18 of the document 10 for increasing the security of the document 10. The printing of the security pattern 46 may overlay at least a portion of the first toner 11. The overlay of the security pattern 46 over a portion of the first toner 11 further enhances the security and the tamper evident properties of the document 10.

In one example, the second color 12 has a color spectrum that is located outside of the color spectrum range of a conventional color photocopier. Accordingly, a conventional color photocopier cannot accurately reproduce the second color 12 of the security pattern 46. For example, the security pattern 46 may use the color blue. The security pattern 46 may contain the words "THIS SECURITY PATTERN IS BLUE." Any attempt to copy the document 10 in a conventional color photocopier will result in the security pattern 46 being a different color. Any observer will note the observed color of the security pattern 46 is different from the stated color contained within the security pattern 46.

For example, the following colors have a color spectrum that is located outside of the color spectrum range of a conventional color photocopier.

| Color | Closest Pantone # | L | a | b |
|-------|-------------------|----|-----|----|
| Blue  | 3005U             | 49 | 2   | 49 |
| Red   | 185U              | 54 | 52  | 33 |
| Green | 354U              | 58 | −48 | 16 |

The above colors blue, red and green are defined by the closest Pantone number and more further defined by the (L, a, b) coordinates of the CIE Laboratory coordinate system.

Preferably, the security pattern 46 is formed in a circular, partially circular or arcuate pattern. The circular, partially circular or arcuate pattern of the security pattern 46 presents a more difficult text to read by an optical code recognition system. The circular, partially circular or arcuate pattern of the security pattern 46 inhibits the direct conversion of image into text by an optical code recognition system.

Figure 5:
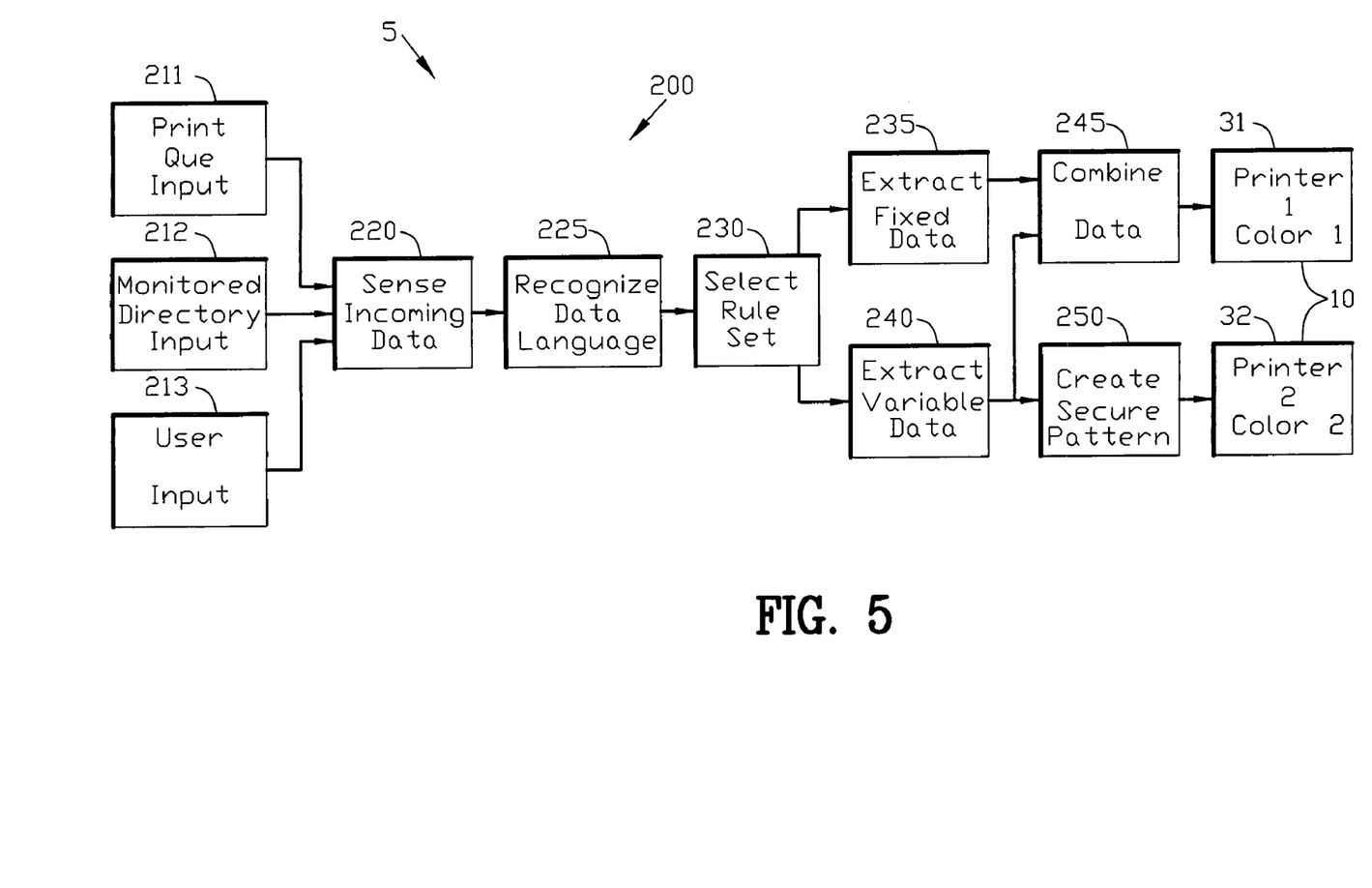
FIG. 5 is a block diagram of a data stream of the process for printing the document.

FIG. 5 is a block diagram of the data stream for of the process 5 for printing the document 10 of the present invention. Data is entered into the system 200 through an input device 211–213. A print que input 211 comprises a printer emulator when viewed from the perspective of the host computer. Print que input 211 enables unattended operation of the system 200. A monitored directory 212 or folder input enables a host computer to use File Transfer Protocol (FTP) to a shared resource wherein the system 200 will access the data following the completion of FTP. The monitored directory 212 input allows unattended operation of the system 200. User input 213 requires an operator to provide the input to the system 200. Data being entered into the system 200 through any of the input devices 211–213 is sensed by the system 200. Sensed data 220 is analyzed and evaluated by the system 220 and the data language and format is recognized 225. The most likely printer languages to be utilized are PostScript or Printer Command Language (PCL). Additionally, a file type is identified, since a single site may utilize more than a single data format. Following data language and format recognition 225, the appropriate rule set is established as the operational protocol. The system 200 then begins to extract fixed data 235 from the data stream, or alternately may access a system resident fixed data 235 and format file. Fixed data 235 may comprise the check format, bank name, account name of the holder and address, and Federal Reserve District codes. Concurrently, variable data is extracted 240 from the data stream. These variable data 240 may comprise check number, payee, date, amount and accounting charge. Extracted variable data 240 is combined 245 with fixed data 235 and downloaded to first printer 31 for printing on document 10 in a first color 11. Selected extracted variable data 240 is utilized to create a secure pattern 250. The security pattern 46 and is subsequently downloaded to a second printer 32 for printing on document 10 in a second color 12. Creation of a security pattern 46 may comprise a matter of choice or may be dictated by the system 200 configuration. For companies that print their own checks, the security pattern 46 may include the payee and check amount. For organizations printing checks for use in checkbooks or the like, the security pattern could include routing information and check number.

The present invention provides a process of printing a document in a first color and a second color that provides a significant advancement in the document security art at an affordable price. The process increases the security of the document by making the document more tamper evident. The present invention provides a process of printing a document in a first color and a second color that provides highly secure documents with the use of existing printing devices for with little or no modification with the use of conventional paper.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A process of printing a document in a first color and a second color, comprising the steps of:
   printing a major portion of the document with a first information in the first color from a first printer;
   creating a second information from at least a portion of the first information;
   arranging the second information into a security pattern; and
   printing the security pattern over a minor portion of the document in the second color from a second printer.

2. A process of printing a document in a first color and a second color as set forth in claim 1, wherein the step of printing the security pattern includes printing the security pattern in a repeated pattern about minor portions of the document for increasing the security of the document.

3. A process of printing a document in a first color and a second color as set forth in claim 1, wherein the step of printing the security pattern includes printing the security pattern in a repeated pattern about the document to overlay at least a portion of the first color.

4. A process of printing a document in a first color and a second color as set forth in claim 1, wherein the first information includes variable information and fixed information; and
   the step of creating the second information from the first information includes extracting variable information from the first information for printing a plurality of the security patterns containing variable information over minor portions of the document in the second color from the second printer for increasing the security of the document.

5. A process of printing a document in a first color and a second color as set forth in claim 1, wherein the first information includes variable information and fixed information;
   the variable information includes a monetary value of the document; and
   the step of creating the second information from the first information includes extracting the monetary value of the document from the first information for printing a plurality of the security patterns containing the variable information over minor portions of the document in the second color from the second printer for increasing the security of the document.

6. A process of printing a document in a first color and a second color as set forth in claim 1, wherein the first information includes variable information and fixed information;
   the variable information includes a payee of the document; and
   the step of creating the second information from the first information includes extracting the payee of the document from the first information for printing a plurality of the security patterns containing the variable information over minor portions of the document in the second color from the second printer for increasing the security of the document.

7. A process of printing a document in a first color and a second color as set forth in claim 1, wherein the first color is black.

8. A process of printing a document in a first color and a second color as set forth in claim 1, wherein the second color has a color spectrum which is located outside of the color spectrum range of a conventional color photo copier.

9. A process of printing a document in a first color and a second color as set forth in claim 1, wherein the second color has a color spectrum incompatible with the color spectrum range of a conventional color photo copier.

10. A process of printing a document in a first color and a second color as set forth in claim 1, wherein the first color is magnetically readable and the second color is non-magnetically readable.

11. A process of printing a document in a first color and a second color, comprising the steps of:
   printing a major portion of the document with a first information in the first color from a first printer;
   creating a second information from at least a portion of the first information;
   arranging the second information into a security pattern; and
   printing the security pattern over a plurality of minor portions about the document in the second color from a second printer to overlay at least some of the first information.

12. A process of printing a document in a first color and a second color as set forth in claim 11, wherein the step of printing the security pattern includes printing the security pattern in a repeated pattern about minor portions of the document for increasing the security of the document.

13. A process of printing a document in a first color and a second color as set forth in claim 11, wherein the step of printing the security pattern includes printing the security pattern in a repeated pattern about the document to overlay at least a portion of the first color.

14. A process of printing a document in a first color and a second color as set forth in claim 11, wherein the first information includes variable information and fixed information; and
   the step of creating the second information from the first information includes extracting variable information from the first information for printing a plurality of the security patterns containing variable information over minor portions of the document in the second color from the second printer for increasing the security of the document.

15. A process of printing a document in a first color and a second color as set forth in claim 11, wherein the first information includes variable information and fixed information;
   the variable information includes a monetary value of the document; and
   the step of creating the second information from the first information includes extracting the monetary value of the document from the first information for printing a plurality of the security patterns containing the variable information over minor portions of the document in the second color from the second printer for increasing the security of the document.

16. A process of printing a document in a first color and a second color as set forth in claim 11, wherein the first information includes variable information and fixed information;
   the variable information includes a payee of the document; and
   the step of creating the second information from the first information includes extracting the payee of the document from the first information for printing a plurality of the security patterns containing the variable information over minor portions of the document in the second color from the second printer for increasing the security of the document.

17. A process of printing a document in a first color and a second color as set forth in claim 11, wherein the first color is black.

18. A process of printing a document in a first color and a second color as set forth in claim 11, wherein the second color has a color spectrum which is located outside of the color spectrum range of a conventional color photo copier.

19. A process of printing a document in a first color and a second color as set forth in claim 11, wherein the second color has a color spectrum incompatible with the color spectrum range of a conventional color photo copier.

20. A process of printing a document in a first color and a second color as set forth in claim 11, wherein the first color is magnetically readable and the second color is non-magnetically readable.

21. A process of printing a negotiable instrument in a first color and a second color, comprising the steps of:
   creating a first digital information containing an instrument format, a payee of the instrument and a monetary value of the instrument;
   creating a second digital information containing at least one of the payee and the monetary value of the instrument;
   printing the negotiable instrument with the instrument format, the payee of the instrument, the monetary value of the instrument in the first color from a first printer;
   arranging the second digital information into a security pattern; and
   printing the security pattern in the second color from a second printer over the negotiable instrument.

22. A process of printing a check in a first color and a second color, comprising the steps of:
   creating a first digital information containing an check format, a payee of the check, a monetary value of the check and a check routing code of the check;
   creating a second digital information containing at least one of the payee of the check and the monetary value of the check;
   printing the check with the check format, the payee of the check, the monetary value of the check and the check routing code of the check in a magnetically readable first color from a first printer;
   arranging the second digital information into a security pattern; and
   printing the security pattern in a non-magnetically readable second color having a color spectrum located outside of the color spectrum range of a conventional color photo copier from a second printer over the check to overlay at least a portion of the first color.

* * * * *